Oct. 1, 1935.  O. H. BANKER  2,015,834
TRANSMISSION CONTROL MECHANISM
Filed Jan. 3, 1933
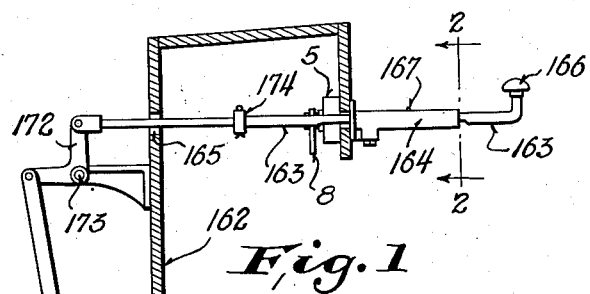
Fig. 1
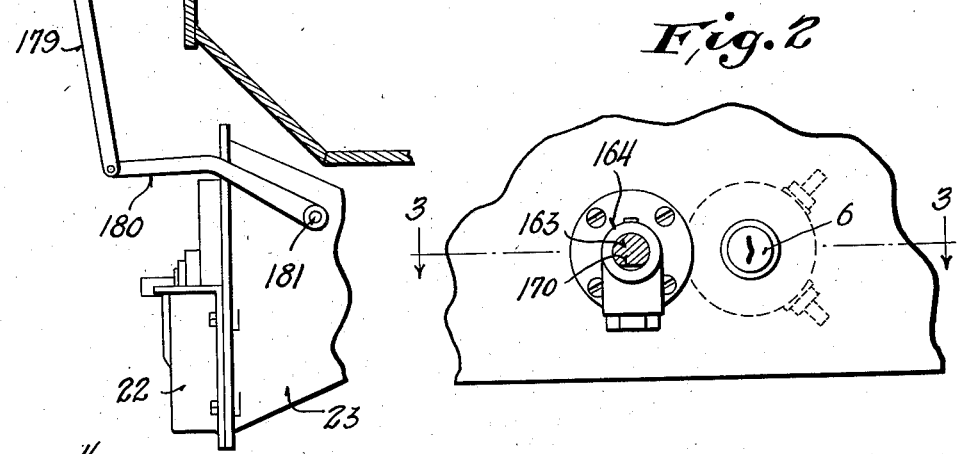
Fig. 2
Fig. 3
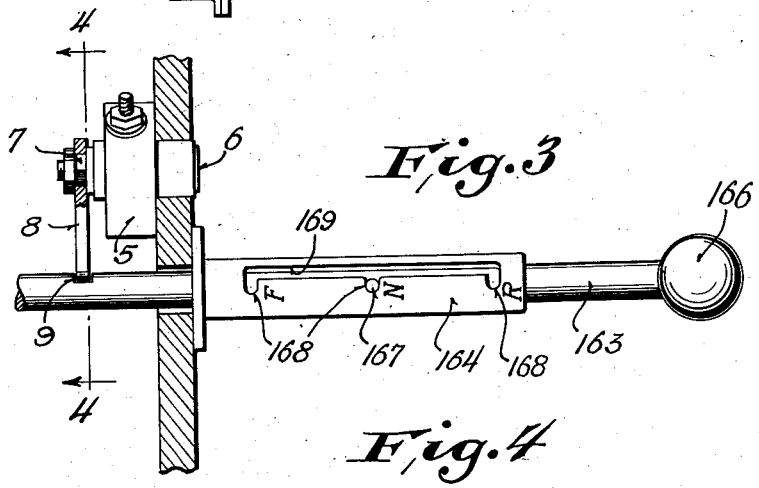
Fig. 4
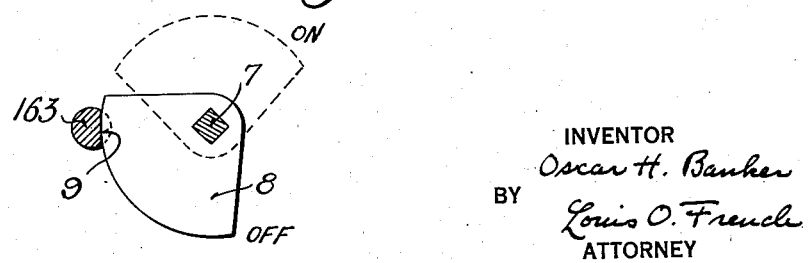
INVENTOR
Oscar H. Banker
BY Louis O. French
ATTORNEY Patented Oct. 1, 1935

2,015,834

UNITED STATES PATENT OFFICE 2,015,834

TRANSMISSION CONTROL MECHANISM

Oscar H. Banker, Chicago, Ill., assignor to New Products Corporation, Chicago, Ill., a corporation of Delaware Application January 3, 1933, Serial No. 649,942

1 Claim. (Cl. 74—483)

The invention relates to control mechanism for transmission mechanisms for automotive vehicles. In those types of transmission mechanisms wherein an automatic clutch is used to connect the engine drive shaft with the transmission, the transmission itself is usually equipped with a control device for putting the transmission in forward, neutral or reverse drive condition. With mechanism of the type above described the operator should always operate the control device to put the transmission in neutral before shutting off the engine. If through neglect the operator fails to put the transmission in neutral before stopping the engine and then subsequently starts the engine with the transmission in condition for forward drive and in accordance with usual practice he steps on the accelerator or opens the throttle partially while the starter is cranking the motor then when the motor starts it will begin to race immediately thus causing the engagement of the automatic clutch and since the transmission has been left in gear or forward drive condition, the vehicle will lurch ahead and considerable damage may result before the vehicle can be stopped. It is the object of the present invention to prevent the above described conditions occurring by providing an interlocking connection between the ignition switch of the engine and the control device for the transmission so that the operator cannot shut off the engine until he puts the transmission in neutral.

In the drawing, Fig. 1 is a side view of a transmission embodying the invention showing its installation in a vehicle, parts being broken away.

Fig. 2 is a detail sectional view taken on the line 2—2 of Fig. 1;

Fig. 3 is a detail sectional view taken on the line 3—3 of Fig. 2;

Fig. 4 is a detail sectional view taken on the line 4—4 of Fig. 3.

The transmission mechanism itself has not been shown in detail as the invention does not reside in such details but is concerned with the control mechanism for those transmissions including an automatic clutch for connecting the engine shaft with the transmission and a control device for placing the transmission in forward, neutral or reverse and as one detailed example of such a transmission reference is here made to my prior United States Letters Patent No. 1,843,195 dated February 2, 1932.

Referring to the drawing, the numeral 22 designates a part of the engine crank case and 23 a housing section of the transmission secured thereto. The shaft 181 is a control shaft corresponding to that of like number in the said Patent No. 1,843,195 and is operable from the dash 162 of the vehicle by an engager 163, the same being a rod slidably and rotatably mounted in a casing 164, secured to the instrument board panel of the dash and working through an opening 165 in said dash and provided with a handle 166. The rod or engager 163 carries a pin 167 adapted to be engaged in one of three notches 168 in the slot 169 formed in the casing 164 and said rod also has a flat side 170 adapted to be engaged by a suitable spring pressed-detent (not shown herein in detail but shown in said Patent No. 1,843,-195) when said rod is in any one of the positions in which the pin 167 is in registry with one of said notches 168. The engager may be released from any one of its positions by turning the same to move the pin out of one of the notches to a position to bring said pin into line with the main slot 169 and then moving it forwardly or backwardly and thereafter turning it upwardly to bring it into position with the proper notch. The engager has three positions indicated by the letters F, N and R on Fig. 3. The engager is pivotally connected to a lever 172 pivoted at 173 to a bracket on the dash and since it or part of it is to be turned, it has a swivel joint connection 174 intermediate its ends. The lever 172 is operatively connected by a link 179 to a crank arm 180 on the control shaft 181 which on being shifted through the operation of the engager acts to put the transmission either in forward, neutral or reverse.

In the drawing, the numeral 5 designates any suitable or well known form of ignition switch having a key-controlled spindle 6 provided with a squared extension 7 upon which a locking plate 8 is mounted and secured, the switch being so mounted on the dash that the plate 8 may be moved, on the turning of the spindle 6 to shut off the ignition into registry with a notch 9 in the engager 163 when the same is in neutral position but which spindle cannot be moved to the "off" position when the engager is in either the forward or reverse positions. Thus an interlock has been provided between the engager or control device and the ignition switch which prevents the shutting off of the motor until the control device has been operated to place the transmission in neutral and as a consequence the possibility of the operator leaving the transmission in gear with possible danger in later starting the car in gear has been eliminated. If by any chance the operator kills his engine by choking or in some other way, he is not likely to leave the vehicle in gear because he naturally turns off the ignition to stop the drain on the battery. If, however, the operator fails to turn the ignition off when the engine is dead, the running down of the battery will prevent his subsequent starting of the vehicle even though it might be in gear.

I desire it to be understood that this invention is not to be limited to any particular form or arrangement of parts except in so far as such limitations are included in the claim.

What I claim as my invention is:

In a vehicle having an automatic clutch connecting the engine with the transmission, the combination of an ignition switch having an operating spindle, a engager operable to place the transmission in forward, neutral or reverse, and a locking plate on said spindle having interlocking connection with said engager when said engager is in neutral position.

OSCAR H. BANKER.